US011118629B2

(12) United States Patent
Witlicki et al.

(10) Patent No.: US 11,118,629 B2
(45) Date of Patent: Sep. 14, 2021

(54) CURVED BEAM CENTERING SPRING FOR A THRUST BEARING

(71) Applicant: United Technologies Corporation, Farmington, CT (US)

(72) Inventors: Russell B. Witlicki, Wethersfield, CT (US); Todd A. Davis, Tolland, CT (US); Christopher M. Valva, Manchester, CT (US); David C. Kiely, Manchester, CT (US); Andrew Newton, Ellington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/710,667

(22) Filed: Dec. 11, 2019

(65) Prior Publication Data

US 2021/0180651 A1 Jun. 17, 2021

(51) Int. Cl.
*F16C 35/06* (2006.01)
*F01D 25/16* (2006.01)
*F16C 35/063* (2006.01)
*F16C 19/10* (2006.01)

(52) U.S. Cl.
CPC ............ *F16C 35/063* (2013.01); *F01D 25/16* (2013.01); *F16C 19/10* (2013.01); *F05D 2220/32* (2013.01); *F05D 2240/52* (2013.01); *F16C 2360/23* (2013.01)

(58) Field of Classification Search
CPC .. F16C 27/045; F16C 2360/23; F16C 35/063; F16F 15/0237; F01D 25/164; F01D 25/16; F05D 2220/32; F05D 2240/50; F05D 2240/52
See application file for complete search history.

(56) References Cited

U.S. PATENT DOCUMENTS

| 4,213,661 A * | 7/1980 | Marmol ............... F16C 27/045 384/99 |
| 4,952,076 A | 8/1990 | Wiley, III et al. |
| 4,992,024 A | 2/1991 | Heydrich |
| 7,419,304 B2 | 9/2008 | Mavrosakis |
| 7,648,278 B2 * | 1/2010 | Stout .................. F16F 15/0237 384/99 |

(Continued)

FOREIGN PATENT DOCUMENTS

| EP | 0712996 A1 | 5/1996 |
| EP | 1630357 A2 | 3/2006 |

(Continued)

OTHER PUBLICATIONS

European Search Report for EP Application No. 20 211652 dated Apr. 29, 2021.

*Primary Examiner* — Alan B Waits
(74) *Attorney, Agent, or Firm* — Carlson, Gaskey & Olds, P.C.

(57) ABSTRACT

A gas turbine engine component includes a bearing configured to support a shaft for rotation about an axis, wherein the bearing includes an outer race and an inner race, and a bearing housing spaced radially outwardly of the outer race. A curved beam centering spring is positioned between the outer race and the bearing housing. A cylindrical wall is radially outward of the bearing housing and engages the outer race and the bearing housing.

20 Claims, 4 Drawing Sheets

(56) References Cited

U.S. PATENT DOCUMENTS

| | | | |
|---|---|---|---|
| 8,202,003 B2 | 6/2012 | Klusman et al. | |
| 8,353,633 B2 | 1/2013 | Griffin | |
| 9,745,992 B2 | 8/2017 | Barber et al. | |
| 10,228,023 B2* | 3/2019 | Clark | F16C 33/6677 |
| 10,316,691 B2 | 6/2019 | Murayama | |
| 2004/0115041 A1 | 6/2004 | Scardicchio et al. | |
| 2006/0204153 A1 | 9/2006 | Alam et al. | |
| 2013/0294917 A1* | 11/2013 | Alam | F16C 27/045 |
| | | | 416/174 |
| 2016/0186607 A1* | 6/2016 | Witlicki | F01D 25/28 |
| | | | 415/229 |
| 2016/0238075 A1* | 8/2016 | Clark | F16F 15/0237 |
| 2016/0327098 A1* | 11/2016 | Long, Jr. | F01D 25/164 |

FOREIGN PATENT DOCUMENTS

| | | |
|---|---|---|
| EP | 3444442 A2 | 2/2019 |
| EP | 3708791 A1 | 9/2020 |

* cited by examiner

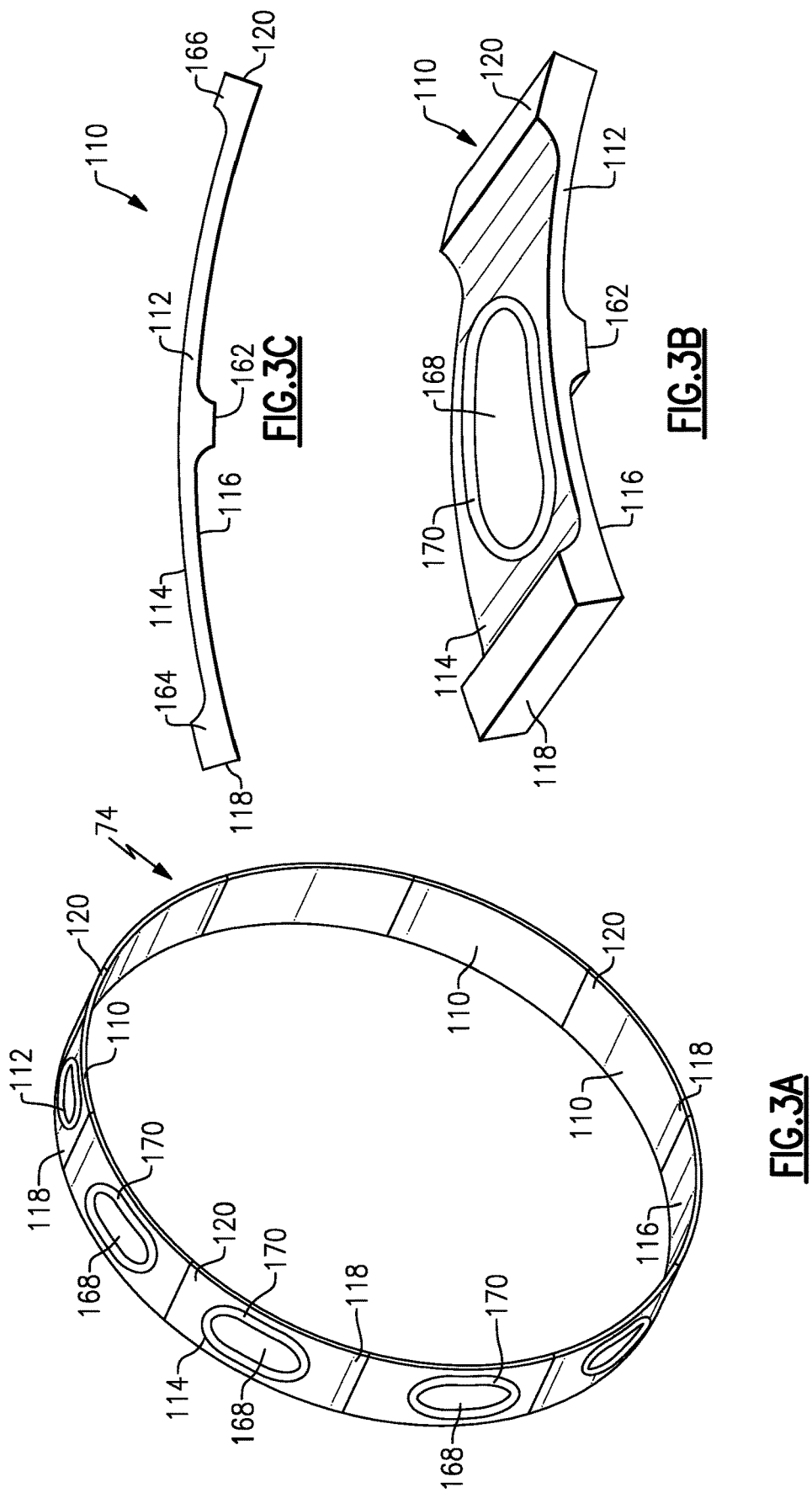

CURVED BEAM CENTERING SPRING FOR A THRUST BEARING

STATEMENT REGARDING FEDERALLY SPONSORED RESEARCH OR DEVELOPMENT

This invention was made with Government support awarded by the United States. The Government has certain rights in this invention.

BACKGROUND

This application relates to a gas turbine engine that includes a curved beam centering spring arrangement for a thrust bearing.

Gas turbine engines are known and typically include a fan delivering air into a bypass duct as bypass air and into a compressor as core air. The air is compressed and delivered into a combustor section where the air is mixed with fuel and ignited. Products of the combustion pass downstream over turbine rotors, which causes the turbine rotors to rotate.

Gas turbine engines require specific support stiffnesses and/or oil feed dampers to manage vibrations of rotating and static structures at specific operating speeds. In one configuration, a centering spring is used in combination with an oil damper that is positioned between a bearing outer race and a static engine structure. The oil damper comprises an oil squeeze film damper made from a plurality of segments that are mounted directly between the outer race and the engine static structure. The centering spring extends axially away from one end of the film damper to a distal end that is fixed to the static engine structure. While this configuration is effective at managing vibrations, a significant amount of axial space is consumed by the centering spring and damper. Additionally, the centering spring and damper are expensive and complicated to machine due to the large number of tightly controlled surfaces to manage stress and stiffness for a given amount of deflection. Curved beam dampers can also be used to dampen vibrations; however, this configuration is not conducive for providing an effective and reliable oil film damper in some applications.

SUMMARY

In a featured embodiment, a gas turbine engine component includes a bearing configured to support a shaft for rotation about an axis, wherein the bearing includes an outer race and an inner race, and a bearing housing spaced radially outwardly of the outer race. A curved beam centering spring is positioned between the outer race and the bearing housing. A cylindrical wall is radially outward of the bearing housing and engages the outer race and the bearing housing.

In another embodiment according to the previous embodiment, a fluid damper is spaced radially inward of the bearing housing and radially outward of the outer race.

In another embodiment according to any of the previous embodiments, the cylindrical wall includes a first mounting flange that is connected to the outer race and a second mounting flange that is connected to the bearing housing.

In another embodiment according to any of the previous embodiments, the first mounting flange is formed at one end of the cylindrical wall and the second mounting flange is formed at an opposite end of the cylindrical wall.

In another embodiment according to any of the previous embodiments, the first mounting flange extends radially inward and the second mounting flange extends radially outward.

In another embodiment according to any of the previous embodiments, the outer race includes a bearing flange and wherein the bearing housing includes a housing flange, and wherein the first mounting flange is directly connected to the bearing flange and the second mounting flange is directly connected to the housing flange such that the cylindrical wall is rigid in an axial direction and compliant in a radial direction, and such that the curved beam centering spring is only subject to forces in the radial direction.

In another embodiment according to any of the previous embodiments, the bearing housing includes an outer housing wall extending circumferentially about the axis, a radial wall extending outwardly of the outer housing wall, and a shoulder portion that transitions from the radial wall to the bearing flange that extends in a radially outward direction, and wherein the radial wall includes an axially extending lip that seats a radially inner surface of the second mounting flange.

In another embodiment according to any of the previous embodiments, a static structure comprises a cross-over housing that is radially outward of the cylindrical wall, and wherein the housing flange and second mounting flange are connected to a mount flange of the cross-over housing with at least one fastener.

In another embodiment according to any of the previous embodiments, the curved beam centering spring is comprised of a plurality of curved beam segments.

In another embodiment according to any of the previous embodiments, the curved beam centering spring is a single-piece solid ring curved beam.

In another featured embodiment, a gas turbine engine component includes a bearing configured to support a shaft for rotation about an axis, wherein the bearing includes an outer race and an inner race, and a bearing housing spaced radially outwardly of the outer race. A curved beam centering spring is positioned between the outer race and the bearing housing. A fluid damper is between the bearing housing and the curved beam centering spring. A cylindrical wall is radially outward of the bearing housing and engages the outer race and the bearing housing.

In another embodiment according to any of the previous embodiments, the inner race is fixed for rotation with the shaft and the outer race is fixed to a static engine structure, and wherein the bearing housing surrounds the curved beam centering spring to form at least one fluid damping chamber between an inner surface of the bearing housing and an outer surface of the curved beam centering spring that is sealed by one or more piston rings or o-rings to provide the fluid damper as a squeeze film damper.

In another embodiment according to any of the previous embodiments, the curved beam centering spring is comprised of a plurality of curved beam segments.

In another embodiment according to any of the previous embodiments, the curved beam centering spring is a single-piece solid ring curved beam.

In another embodiment according to any of the previous embodiments, the cylindrical wall includes a first mounting flange that is connected to the outer race and a second mounting flange that is connected to the bearing housing.

In another embodiment according to any of the previous embodiments, the first mounting flange is formed at one end of the cylindrical wall and the second mounting flange is formed at an opposite end of the cylindrical wall.

In another embodiment according to any of the previous embodiments, the first mounting flange extends radially inward and the second mounting flange extends radially outward.

In another embodiment according to any of the previous embodiments, the outer race includes a bearing flange and wherein the bearing housing includes a housing flange, and wherein the first mounting flange is directly connected to the bearing flange and the second mounting flange is directly connected to the housing flange such that the cylindrical wall is rigid in an axial direction and compliant in a radial direction, and such that the curved beam centering spring is only subject to forces in the radial direction.

In another embodiment according to any of the previous embodiments, the bearing housing includes an outer housing wall extending circumferentially about the axis, a radial wall extending outwardly of the outer housing wall, and a shoulder portion that transitions from the radial wall to the bearing flange that extends in a radially outward direction, and wherein the radial wall includes an axially extending lip that seats a radially inner surface of the second mounting flange.

In another embodiment according to any of the previous embodiments, a static structure comprises a cross-over housing that is radially outward of the cylindrical wall, and wherein the housing flange and second mounting flange are connected to a mount flange of the cross-over housing with at least one fastener.

These and other features may be best understood from the following drawings and specification.

BRIEF DESCRIPTION OF THE DRAWINGS

FIG. 3A is a perspective view of a plurality of curved beam spring segments of FIG. 2.

FIG. 3B is an enlarged perspective of one of the plurality of curved beam spring segments of 3A.

FIG. 3C is a side view of the curved beam spring segment of FIG. 3B.

DETAILED DESCRIPTION

Figure 1:
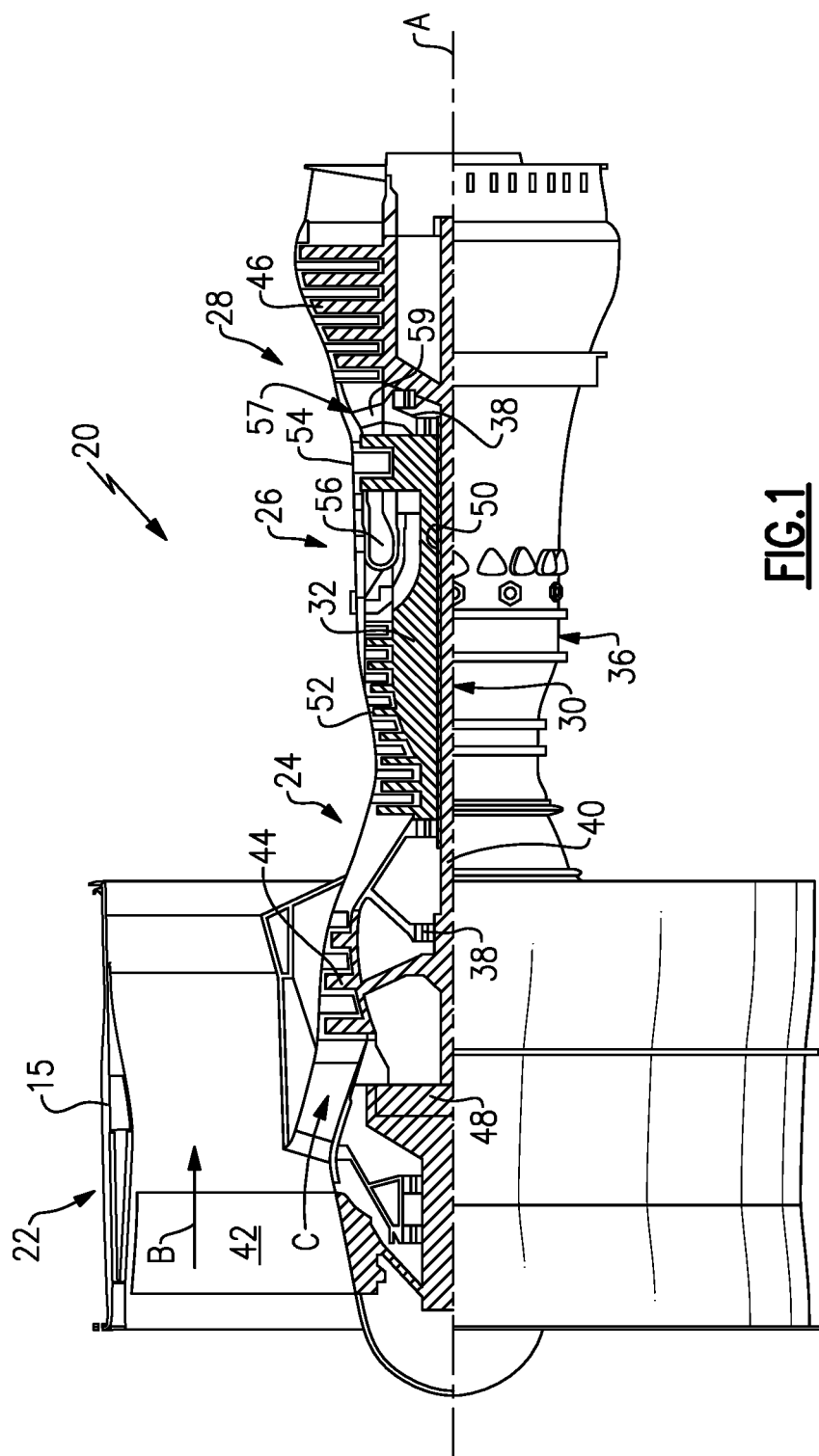
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a first (or low) pressure compressor 44 and a first (or low) pressure turbine 46. The inner shaft 40 is connected to a fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150 ft/second (350.5 meters/second).

Figure 2:
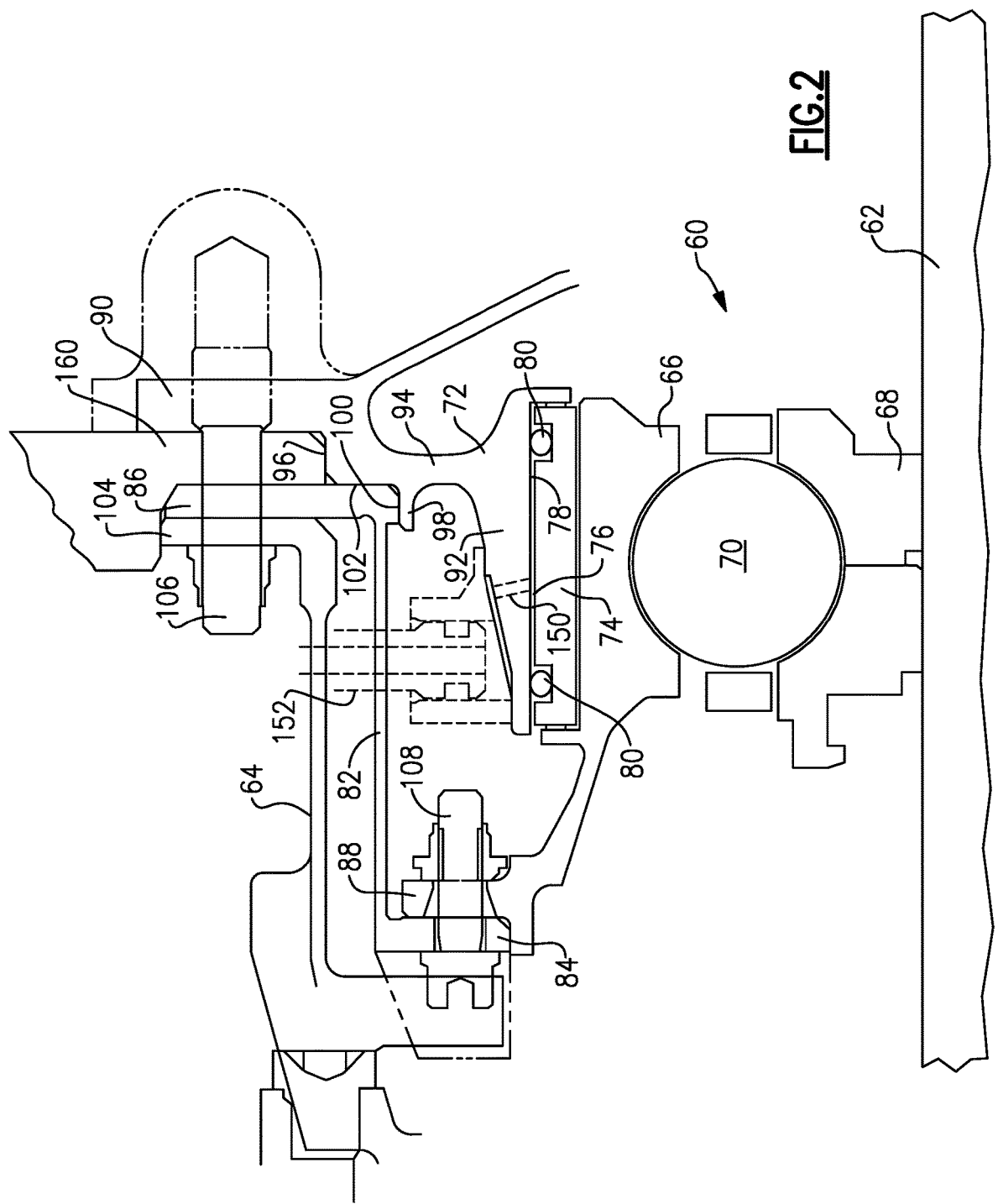
FIG. 2 is a section view of a curved beam centering spring and a squeeze damper.

FIG. 2 shows an example of a curved beam centering spring arrangement for a thrust bearing that provides desired support stiffness and damping to manage vibrations of associated rotating and static structures at specific engine operating speeds. At least one bearing 60 supports a rotating structure 62, such as a shaft for example, for rotation relative to an engine static structure, such as a case structure or cross-over housing 64, for example. The bearing 60 includes an outer race 66, an inner race 68, and one or more rolling elements 70 between the inner 68 and outer 66 races. The inner race 68 is fixed for rotation with the rotating structure 62 and the outer race is fixed to a non-rotating structure. A bearing housing 72 is spaced radially outwardly of the outer race 66.

A curved beam centering spring 74 is positioned between the outer race 66 and the bearing housing 72. A fluid damper 76 is positioned between the bearing housing and the curved beam centering spring 74. In one example, the bearing housing 72 surrounds the curved beam centering spring 74 to form at least one fluid damping chamber 78 between an inner surface of the bearing housing 72 and an outer surface of the curved beam centering spring 74. The damping chamber 78 is sealed by one or more piston rings or o-rings 80 to provide a squeeze film damper.

A cylindrical wall 82 is positioned radially outward of the bearing housing 72 and is configured to engage the outer race 66 and the bearing housing 72. The cylindrical wall 82 is a relatively thin wall extending circumferentially about an axis, and is rigid in the axial direction to transmit the bilateral engine thrust load to ground, but is compliant in the radial direction to not interfere with the centering spring 74 and damper 76. In one example, the cylindrical wall 82 includes a first mounting flange 84 that is connected to the outer race 66 and a second mounting flange 86 that is connected to the bearing housing 72. The first mounting flange 84 is formed at one end of the cylindrical wall 82 and the second mounting flange 86 is formed at an opposite end of the cylindrical wall 82. In one example, the first mounting flange 84 extends radially inward and the second mounting flange 86 extends radially outward.

In one example, the outer race 66 includes a bearing flange 88 and the bearing housing 72 includes a housing flange 90. In one example, the first mounting flange 84 is directly connected to the bearing flange 88 and the second mounting flange 86 is directly connected to the housing flange 90 such that the cylindrical wall 82 is rigid in an axial direction and compliant in a radial direction. In this configuration, the curved beam centering spring 74 is only subject to forces in the radial direction. This makes sealing of the fluid damping chamber 78 much more robust.

In one example, the bearing housing 72 includes an outer housing wall 92 extending circumferentially about the axis, a radial wall 94 extending outwardly of the outer housing wall 92, and a shoulder portion 96 that transitions from the radial wall 94 to the bearing flange 90, which extends in a radially outward direction. In one example, the radial wall 94 includes an axially extending lip 98 that seats a radially inner surface 100 of the second mounting flange 86. In this configuration, a lower portion of an end face 102 of the second mounting flange 86 abuts directly against the radial wall 94 and an upper portion of the end face 102 abuts directly against an intermediate case flange 160. The case flange 160 is sandwiched between the housing flange 90 and the second mounting flange 86. This provides radial stiffness for the centering spring 74 and damper 76 but does not subject the spring or damper to axial loading.

In one example, the cross-over housing 64 is radially outward of the cylindrical wall 82. In one example, the housing flange 90 and second mounting flange 86 are connected to a mount flange 104 of the cross-over housing 64 with at least one fastener 106. This forms a first bolted joint between the cross-over housing 64, cylindrical wall 82, and the bearing housing 72. In one example, the first mounting flange 84 and the bearing flange 88 are connected together with at least one fastener 108. This forms a second bolted joint between the outer race 66 and the cylindrical wall 82. The two bolted joints are axially spaced apart from each other. In one example, the first bolted joint is radially outward of the second bolted joint as shown in FIG. 2.

In one example, the curved beam centering spring 74 is comprised of a plurality of curved beam segments 110 as shown in FIGS. 3A-3C. FIG. 3A shows the curved beam centering spring 74 that forms a ring, which is comprised of the curved beam spring segments 110. FIGS. 3B-3C show an example of one of the curved beam spring segments 110. Each curved beam spring segment 110 includes an arcuate body 112 with an outer surface 114 that forms a portion of an outer peripheral surface of the ring and an inner surface 116 that forms a portion of an inner peripheral surface of the ring. Each arcuate body 112 extends circumferentially from a first end 118 to a second end 120 that is opposite the first end 118. The ends 118, 120 of adjacent bodies 112 abut against each other when the curved beam spring segments 110 are positioned to form the ring. The number of curved beam spring segments 110 can vary.

In one example, each segment 110 has an inner pedestal 162 on an inside diameter surface at its center and outer pedestals 164 and 166 on an outside diameter surface at the respective opposing segment ends 118, 120. A fluid recess 168 is formed on an outer surface of each segment 110. Loads due to shaft imbalance are transmitted through bearing 60 to the inner pedestal 162, which contacts the outer diameter surface of the bearing outer race 66. Rotor imbalances cause the segment 110 to deflect and compress the fluid film captured in the fluid recess 168. The fluid recesses 168 are each bounded by a groove 170 configured in a racetrack shape to support a sealing ring. The fluid recesses 168 are continuously fed fluid from a supply tube 152 (FIG. 2). Each fluid recess 168 may have one or more inlet holes 150 (FIG. 2) and at least one outlet (not shown). In the configuration shown in FIG. 2, the fluid damping chamber 78 corresponds to one of the fluid recesses 168 (FIG. 3B) and the sealing ring 80 corresponds to the sealing ring received within the groove 170 (FIG. 3B). The use of racetrack fluid recesses 168 is just one example configuration of a fluid damper, and other fluid damping configurations could also be utilized.

Figure 4A:
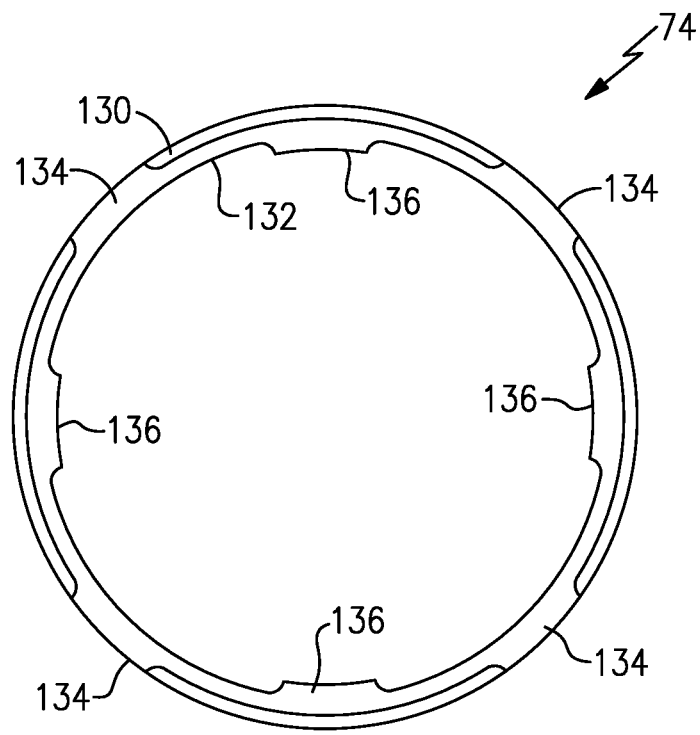
FIG. 4A is a perspective view of another example of a curved beam centering spring.
Figure 4B:
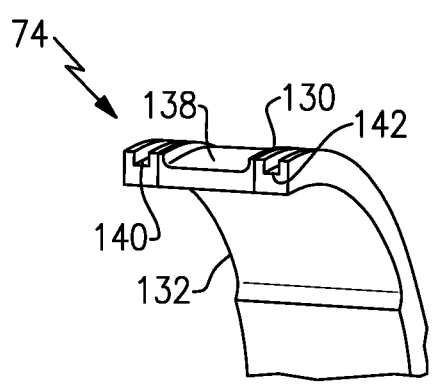
FIG. 4B is an enlarged section view of the curved beam centering spring of FIG. 4A.

In another example, the curved beam centering spring 74 comprises a single-piece solid ring curved beam as shown in FIGS. 4A-4B. An example of this spring is set forth in application Ser. No. 16/668,684 filed on Oct. 30, 2019, which is assigned to the assignee of the subject disclosure. In this example, the curved beam centering spring 74 has an outer peripheral surface 130 and an inner peripheral surface 132. As shown in FIG. 4A, the curved beam centering spring 74 includes a plurality of outer diameter (OD) pedestals 134 that are formed in the outer peripheral surface 130, and which are circumferentially spaced apart from each other. The curved beam centering spring 74 further includes a plurality of inner diameter (ID) pedestals 136 that are formed in the inner peripheral surface 132, and which are circumferentially spaced apart from each other. The curved beam centering spring 74 also includes a plurality of fluid recesses 138 (FIG. 4B) that are formed in the outer peripheral surface 130, and which are circumferentially spaced apart from each other. The plurality of fluid recesses 138 circumferentially alternate with the plurality of outer diameter pedestals 134. As such, there is one fluid recess 138 between each adjacent pair of outer diameter pedestals 134.

In one example, the plurality of outer diameter pedestals 134 are circumferentially offset from the plurality of inner diameter pedestals 136. In one example, each inner diameter pedestal 136 is radially aligned with a corresponding one of the plurality of fluid recesses 138. The outer 134 and inner 136 diameter pedestals serve as spring structures to allow flexure in the radial direction to control stiffness and transfer radial loads to the static structure. The plurality of recesses 138 are configured to receive a fluid, such as oil for example, and serve as an oil squeeze film damper.

As shown in FIG. 4B, a first groove 140 is formed in the outer peripheral surface 130 and a second groove 142 is formed in the outer peripheral surface 130. In this example, the piston rings or o-rings 80 (FIG. 2) are positioned within the first groove 140 and the second groove 142 to provide sealing for each of the circumferentially spaced fluid recesses 138. Thus, the fluid damping chamber 78 of FIG. 2 corresponds to one of the fluid recesses 138. In one example, each of the fluid recesses 138 of the solid ring curved beam have one or more fluid inlets 150 as shown in FIG. 2 and each have at least one outlet (not shown). In another example, the solid ring can have one fluid feed or inlet 150 and the outer diameter pedestals 134 can have slots to feed fluid from one cavity to another. In one example, the inlet 150 extends through the outer housing wall 92 of the bearing housing 72. The supply tube 152 is configured to supply fluid to the inlet(s) 150.

The subject disclosure provides a curved beam centering spring and damper configuration that eliminates rolling problems related to segmented configurations. By creating an arrangement of parts that provides an alternate path for the axial thrust load, the curved beams are only exposed to force in the radial direction. For the multi-piece segment configuration, this makes fluid sealing more robust and reduces scuffing between mating surfaces of the segmented beams. For the solid damper ring configuration, a more conventional circumferential oil damper configuration is provided in combination with the cylindrical wall that takes the thrust loading. This arrangement of a curved beam and a thrust load carrying member results in a damper that is radially compliant, provides the capability of withstanding bilateral thrust loading, and offers the ability to tune stiffness as required with the curved beams.

Additionally, the curved beam design provides a wide range of applicability by allowing a more compact and lightweight design than a conventional centering spring design with fully machined beams. The separation of the axial thrust load addresses sealing and scuffing issues experienced by trying to transmit the thrust load through the segmented beams as done in traditional configurations.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A gas turbine engine component comprising:
a bearing configured to support a shaft for rotation about an axis, wherein the bearing includes an outer race and an inner race;
a bearing housing spaced radially outwardly of the outer race;
a curved beam centering spring positioned between the outer race and the bearing housing;
a fluid damper spaced radially inward of the bearing housing and radially outward of the outer race;
a cylindrical wall radially outward of the bearing housing, wherein the cylindrical wall engages the outer race and the bearing housing, and wherein the cylindrical wall includes a first mounting flange that is connected to the outer race and a second mounting flange that is connected to the bearing housing; and
at least one fluid inlet extending through the bearing housing at a location that is between the first mounting flange and the second mounting flange.

2. The gas turbine engine component according to claim 1, wherein the first mounting flange is formed at one end of the cylindrical wall and the second mounting flange is formed at an opposite end of the cylindrical wall.

3. The gas turbine engine component according to claim 2, wherein the first mounting flange extends radially inward and the second mounting flange extends radially outward.

4. The gas turbine engine component according to claim 1, wherein the outer race includes a bearing flange and wherein the bearing housing includes a housing flange, and wherein the first mounting flange is directly connected to the bearing flange and the second mounting flange is directly connected to the housing flange such that the cylindrical wall is rigid in an axial direction and compliant in a radial direction, and such that the curved beam centering spring is only subject to forces in the radial direction.

5. The gas turbine engine component according to claim 1, wherein the curved beam centering spring is comprised of a plurality of curved beam segments.

6. The gas turbine engine component according to claim 1, wherein the curved beam centering spring is a single-piece solid ring curved beam.

7. The gas turbine engine component according to claim 1, including a cross-over housing that is radially outward of the cylindrical wall and which includes a cross-over housing flange, and wherein the bearing housing includes a bearing housing flange, and wherein the second mounting flange of the cylindrical wall, the bearing housing flange, and the cross-over housing flange are all connected to an intermediate case flange via at least one common fastener.

8. The gas turbine engine component according to claim 7, wherein the intermediate case flange is sandwiched directly between the housing flange and the second mounting flange.

9. A gas turbine engine component comprising:
a bearing configured to support a shaft for rotation about an axis, wherein the bearing includes an outer race and an inner race;
a bearing housing spaced radially outwardly of the outer race;
a curved beam centering spring positioned between the outer race and the bearing housing;

a cylindrical wall radially outward of the bearing housing, wherein the cylindrical wall engages the outer race and the bearing housing, and wherein the cylindrical wall includes a first mounting flange that is connected to the outer race and a second mounting flange that is connected to the bearing housing;

wherein the outer race includes a bearing flange and wherein the bearing housing includes a housing flange, and wherein the first mounting flange is directly connected to the bearing flange and the second mounting flange is directly connected to the housing flange such that the cylindrical wall is rigid in an axial direction and compliant in a radial direction, and such that the curved beam centering spring is only subject to forces in the radial direction; and wherein the bearing housing includes an outer housing wall extending circumferentially about the axis, a radial wall extending outwardly of the outer housing wall, and a shoulder portion that transitions from the radial wall to the bearing flange that extends in a radially outward direction, and wherein the radial wall includes an axially extending lip that seats a radially inner surface of the second mounting flange.

10. A gas turbine engine component comprising:

a bearing configured to support a shaft for rotation about an axis, wherein the bearing includes an outer race and an inner race;

a bearing housing spaced radially outwardly of the outer race;

a curved beam centering spring positioned between the outer race and the bearing housing;

a cylindrical wall radially outward of the bearing housing, wherein the cylindrical wall engages the outer race and the bearing housing, wherein the cylindrical wall includes a first mounting flange that is connected to the outer race and a second mounting flange that is connected to the bearing housing;

wherein the outer race includes a bearing flange and wherein the bearing housing includes a housing flange, and wherein the first mounting flange is directly connected to the bearing flange and the second mounting flange is directly connected to the housing flange such that the cylindrical wall is rigid in an axial direction and compliant in a radial direction, and such that the curved beam centering spring is only subject to forces in the radial direction; and a static structure comprising a cross-over housing that is radially outward of the cylindrical wall, and wherein the housing flange and second mounting flange are connected to a mount flange of the cross-over housing with at least one fastener.

11. A gas turbine engine component comprising:

a bearing configured to support a shaft for rotation about an axis, wherein the bearing includes an outer race and an inner race;

a bearing housing spaced radially outwardly of the outer race;

a curved beam centering spring positioned between the outer race and the bearing housing;

a fluid damper between the bearing housing and the curved beam centering spring;

a cylindrical wall radially outward of the bearing housing, wherein the cylindrical wall engages the outer race and the bearing housing, wherein the cylindrical wall includes a first mounting flange that is connected to the outer race and a second mounting flange that is connected to the bearing housing; and at least one fluid inlet extending through the bearing housing at a location that is axially between the first mounting flange and the second mounting flange.

12. The gas turbine engine component according to claim 11, wherein the inner race is fixed for rotation with the shaft and the outer race is fixed to a static engine structure, and wherein the bearing housing surrounds the curved beam centering spring to form at least one fluid damping chamber between an inner surface of the bearing housing and an outer surface of the curved beam centering spring that is sealed by one or more piston rings or o-rings to provide the fluid damper as a squeeze film damper.

13. The gas turbine engine component according to claim 12, wherein the curved beam centering spring is comprised of a plurality of curved beam segments.

14. The gas turbine engine component according to claim 12, wherein the curved beam centering spring is a single-piece solid ring curved beam.

15. The gas turbine engine component according to claim 11, wherein the first mounting flange is formed at one end of the cylindrical wall and the second mounting flange is formed at an opposite end of the cylindrical wall.

16. The gas turbine engine component according to claim 15, wherein the first mounting flange extends radially inward and the second mounting flange extends radially outward.

17. The gas turbine engine component according to claim 16, wherein the outer race includes a bearing flange and wherein the bearing housing includes a housing flange, and wherein the first mounting flange is directly connected to the bearing flange and the second mounting flange is directly connected to the housing flange such that the cylindrical wall is rigid in an axial direction and compliant in a radial direction, and such that the curved beam centering spring is only subject to forces in the radial direction.

18. The gas turbine engine component according to claim 11, including a cross-over housing that is radially outward of the cylindrical wall and which includes a cross-over housing flange, and wherein the bearing housing includes a bearing housing flange, and wherein the second mounting flange of the cylindrical wall, the bearing housing flange, and the cross-over housing flange are all connected to an intermediate case flange via at least one common fastener, and wherein the intermediate case flange is sandwiched directly between the housing flange and the second mounting flange.

19. A gas turbine engine component comprising:

a bearing configured to support a shaft for rotation about an axis, wherein the bearing includes an outer race and an inner race;

a bearing housing spaced radially outwardly of the outer race;

a curved beam centering spring positioned between the outer race and the bearing housing;

a fluid damper between the bearing housing and the curved beam centering spring;

a cylindrical wall radially outward of the bearing housing, wherein the cylindrical wall engages the outer race and the bearing housing;

wherein the inner race is fixed for rotation with the shaft and the outer race is fixed to a static engine structure, and wherein the bearing housing surrounds the curved beam centering spring to form at least one fluid damping chamber between an inner surface of the bearing housing and an outer surface of the curved beam centering spring that is sealed by one or more piston rings or o-rings to provide the fluid damper as a squeeze film damper;

wherein the cylindrical wall includes a first mounting flange that is connected to the outer race and a second mounting flange that is connected to the bearing housing;

wherein the first mounting flange is formed at one end of the cylindrical wall and the second mounting flange is formed at an opposite end of the cylindrical wall;

wherein the first mounting flange extends radially inward and the second mounting flange extends radially outward;

wherein the outer race includes a bearing flange and wherein the bearing housing includes a housing flange, and wherein the first mounting flange is directly connected to the bearing flange and the second mounting flange is directly connected to the housing flange such that the cylindrical wall is rigid in an axial direction and compliant in a radial direction, and such that the curved beam centering spring is only subject to forces in the radial direction; and wherein the bearing housing includes an outer housing wall extending circumferentially about the axis, a radial wall extending outwardly of the outer housing wall, and a shoulder portion that transitions from the radial wall to the bearing flange that extends in a radially outward direction, and wherein the radial wall includes an axially extending lip that seats a radially inner surface of the second mounting flange.

20. The gas turbine engine component according to claim 19, wherein the static engine structure comprises a cross-over housing that is radially outward of the cylindrical wall, and wherein the housing flange and second mounting flange are connected to a mount flange of the cross-over housing with at least one fastener.

\* \* \* \* \*